United States Patent [19]

Breu

[11] Patent Number: 4,715,611
[45] Date of Patent: Dec. 29, 1987

[54] MOUNTING OF THE COUPLING BODY OF A TRAILER COUPLING IN THE CROSS-PIECE

[75] Inventor: Johann Breu, Munich, Fed. Rep. of Germany

[73] Assignee: Rockinger Spezialfabrik für Anhängerkupplungen GmbH & Co., Munich, Fed. Rep. of Germany

[21] Appl. No.: 896,889

[22] Filed: Aug. 14, 1986

[30] Foreign Application Priority Data

Aug. 27, 1985 [DE] Fed. Rep. of Germany ....... 3530565

[51] Int. Cl.⁴ .............................................. B60D 1/00
[52] U.S. Cl. .................................. 280/504; 280/483; 280/495
[58] Field of Search ............... 280/504, 505, 515, 495, 280/493, 484

[56] References Cited

U.S. PATENT DOCUMENTS 2,591,487  4/1952  Witz ................................... 280/504

FOREIGN PATENT DOCUMENTS 1555378  10/1970  Fed. Rep. of Germany .
2732610  1/1979  Fed. Rep. of Germany .
2912277  10/1980  Fed. Rep. of Germany .
3009914  9/1981  Fed. Rep. of Germany .
195194  4/1938  Switzerland ....................... 280/515

Primary Examiner—John J. Love
Assistant Examiner—Donn McGiehan
Attorney, Agent, or Firm—Toren, McGeady & Associates

[57] ABSTRACT

A mounting for the draw rod of the coupling body of a trailer coupling is proposed. The draw rod passes through a cross-piece bore of a cross-piece fast with the towing vehicle. The cross-section of the draw rod at the passage through the cross-piece bore corresponds to the cross-section of the cross-piece bore. A bearing tube secured to the cross-piece for the guidance of the draw rod extends from the cross-piece only in the direction pointing away from the coupling body. Between the end of the draw rod remote from the cross-piece and the end of the bearing tube remote from the cross-piece a support acting in both force directions is provided, that is to say a support for traction force transmission and a support for thrust force transmission. In the solution according to the invention the cross-section of the draw rod can be enlarged compared with conventional forms of embodiment.

15 Claims, 3 Drawing Figures

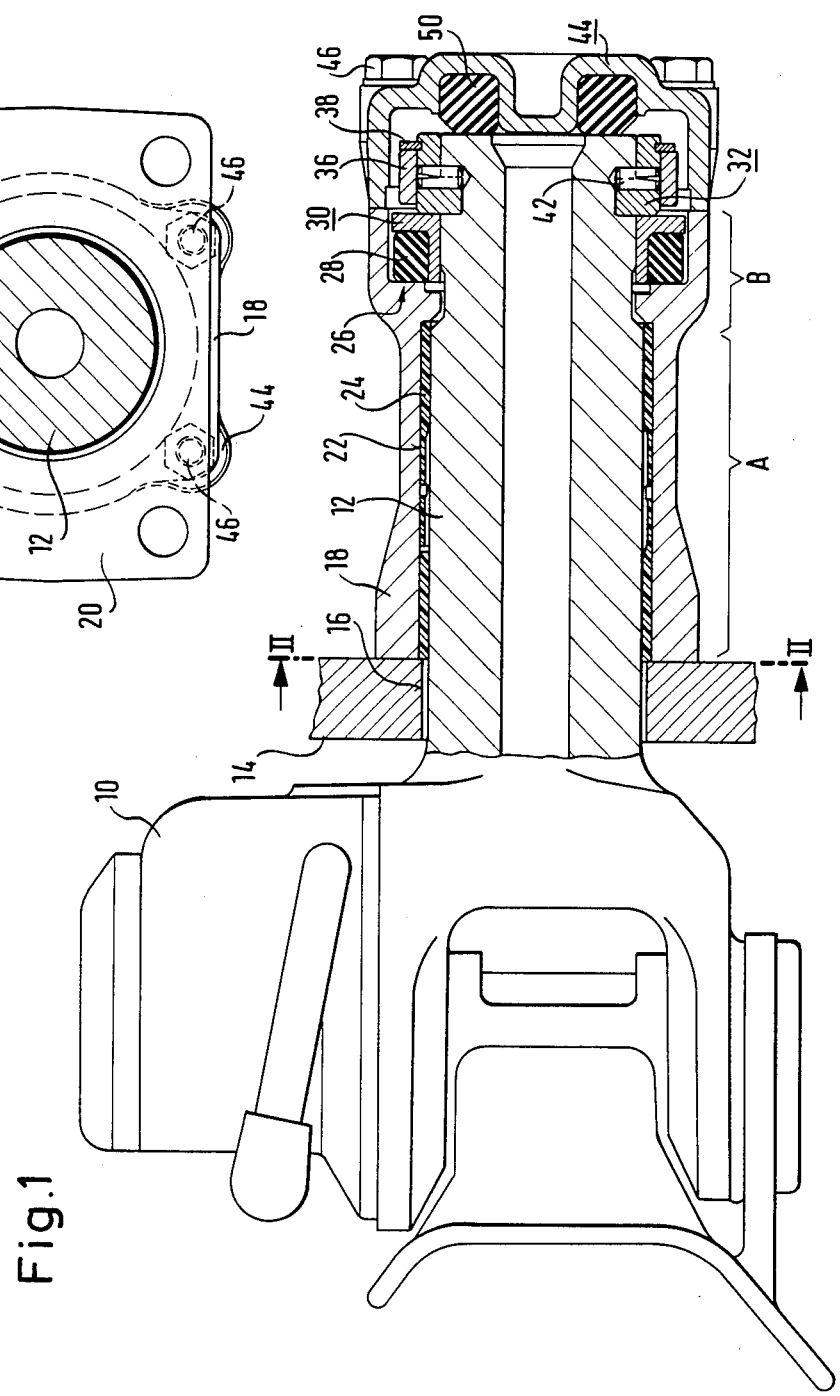

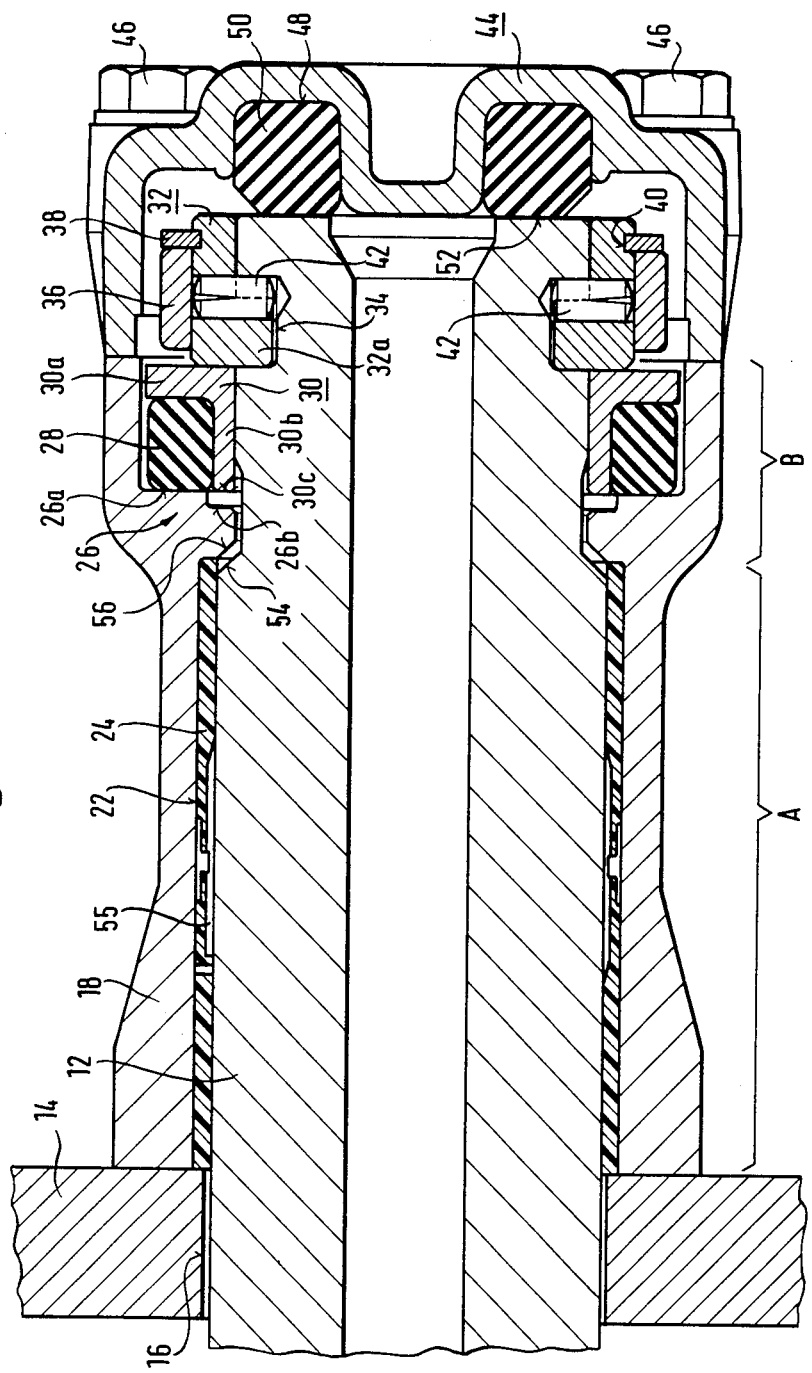

MOUNTING OF THE COUPLING BODY OF A TRAILER COUPLING IN THE CROSS-PIECE

BACKGROUND OF THE INVENTION

The invention relates to a mounting of the coupling body of a trailer coupling on a towing vehicle by means of a draw rod issuing from the coupling body, where this draw rod passes through a bore of a cross-piece fitted on the towing vehicle, where further the draw rod is guided in a passage, concentric with the cross-piece bore, of a bearing tube secured to the cross-piece, and where the draw rod is supported on the bearing tube in both force directions, that is for traction and thrust force transmission.

STATEMENT OF PRIOR ART

Such a draw rod mounting is known from Fed. German Publ. Sp. No. 2,732,610. In this known form of embodiment the bearing tube passes through the cross-piece bore. The internal cross-section of the passage of the bearing tube is accordingly smaller than the cross-section of the cross-piece bore. This signifies that the cross-section of the draw rod at the position of passage through the cross-piece bore and, for assembly reasons, on its entire length between the position of passage and its free end, must be smaller than the cross-section of the cross-piece bore.

On the other hand the cross-section of the cross-piece bore is standardised, so that for the cross-section of the draw rod there results a dimension which must not be exceeded on account of the finite annular cross-section of the bearing tube at the location of passage through the cross-piece bore, which dimension is smaller than the cross-sectional dimension of the cross-piece bore. This dimension available for the cross-section of the draw rod has hitherto always been regarded as adequate.

OBJECT OF THE INVENTION

It has now been recognised by the applicants that under certain conditions it would after all be more favourable to enlarge the cross-section of the draw rod, especially with regard to bending and shear loadings, which occur in the coupling of centre-axle trailers with rigid tow bar.

The invention is based upon the problem of developing a mounting of this classification so that increased transverse forces, that is forces transverse to the axis of the coupling body lying in the direction of travel, can be introduced into the coupling body.

SUMMARY OF THE INVENTION

According to the invention there is provided a mounting in a trailer coupling for a towing vehicle having a coupling body, a draw rod issuing from the coupling body, a cross-piece for attachment to the towing vehicle, a bearing tube secured to the cross-piece and having a passage therein concentric with the bore of the cross-piece, said draw rod passing through a bore in the cross-piece and being guided in said passage, said draw rod being axially supported on the bearing tube against traction force and thrust force transmission, the improvement being that the cross-section of the draw rod occupies substantially the full cross-section of the cross-piece bore and the bearing tube, commencing on the side of the cross-piece remote from the coupling body, extends exclusively in the direction away from the coupling body.

In this manner the bearing tube no longer occupies a part of the cross-piece bore cross-section as hitherto, so that the draw rod cross-section can be increased to the full dimension of the cross-piece bore cross-section. Naturally it is not necessary that the draw rod cross-section should correspond exactly to the full dimension of the cross-piece bore cross-section. It is sufficient if use is made of the possibility of cross-sectional enlargement which is provided by the omission of the bearing tube cross-section in the region of the cross-piece bore. The guidance of the draw rod in the bearing tube is at least just as good in the solution according to the invention as in the known solution. The installation conditions also are not impaired in the solution according to the invention. On the contrary it is now possible to bring the coupling body still closer to the cross-piece and as a rule there is adequate space on the rear of the cross-piece for the bearing tube which issues from the cross-piece and extends exclusively in the direction away from the coupling body.

With the solution in accordance with the invention it is possible to leave the cross-section of the draw rod in a length part of the bearing tube adjoining the cross-piece, at the size of the cross-section of the cross-piece bore, and thus further to increase the transverse force load capacity of the coupling body.

One could consider providing the support for thrust force transmission between the cross-piece for the one part and the coupling body for the other part, so that only the traction force transmission would have to be provided in the region of the end of the draw rod and of the bearing tube remote from the coupling body. Admittedly this solution has the disadvantage that different wall thicknesses of the cross-piece must be taken into account in assembly. Therefore preference will be given to a solution in which the draw rod is supported in both force directions at the end section of the bearing tube remote from the cross-piece. Thus the wall thickness of the cross-piece is of no further importance for assembly. According to the wall thickness of the cross-piece only the distance between the coupling body and the surface of the cross-piece on the coupling body side is increased or decreased.

With regard to simplicity of assembly it is proposed that the draw rod is supported in the traction direction on a shoulder formation of the bearing tube by a traction abutment on the draw rod side, which can be fitted on the draw rod after the draw rod has been conducted through the passage of the bearing tube, and that the draw rod is supported in the thrust direction on a cover or yoke part which is fitted on the end of the bearing tube remote from the cross-piece after the fitting of the traction abutment on the draw rod.

For the sake of elastic traction force transmission an annular traction force buffer, which can also be under initial stress as will be stated in detail further below, can be arranged between the traction abutment on the draw rod side and the shoulder formation. In order to avoid over-loading of such a traction force buffer a system of traction distance limiting stops can be provided between the traction abutment on the draw rod side and the shoulder formation, perhaps in a manner in which the traction force buffer is accommodated axially between a radially outwardly pointing flange, normal to the axis and abutting on the traction abutment, of a ring of L-cross-section and a first radially outer shoulder face of the shoulder formation, and the traction distance limiting stops are formed by a second, radially inner, shoulder face of the shoulder formation and the end directed towards the cross-piece of a sleeve part of the ring of L-cross-section which is directed parallel to the axis and abuts on the traction force buffer on its radially inner side. The traction force buffer can here also be enclosed between the faces of the ring of L-cross-section and the shoulder formation in such a way that it is fully corseted as from a predetermined traction force, and therefore itself acts as a traction distance limiting stop thanks to its volume noncompressibility.

According to a preferred form of embodiment the traction abutment is formed by a segment ring with at least two segments, which is accommodated and secured in a segment ring accommodating groove of the draw rod. This form of embodiment merits preference over other possible forms of embodiment of the traction abutment for example by means of screws, because the course of forces is unambiguously moniterable and because there is no danger of the most heavily loaded surfaces being deformed by the loading in a manner troublesome to dismantlement and subsequent re-assembly if necessary.

The segment ring can be secured in any desired manner. For the securing of the segment ring a segment encircling ring is preferably provided which surrounds the segment ring; in this case the segment encircling ring can be secured on the segment ring in the axial direction on the one hand by the flange of the ring of L-cross-section normal to the axis and on the other by a radially resilient spring ring, the latter being snapped into a spring ring accommodating groove in the external circumferential surface of the segment ring.

For the avoidance of force transmission jolts a thrust force buffer can also be provided in the thrust direction. With regard to an initial stressing to be discussed hereinafter it is advisable to arrange this thrust force buffer between the end of the draw rod remote from the cross-piece and the cover or yoke part.

In order to avoid over-loading of the thrust force buffer, thrust distance limiting stops can be provided between the draw rod and the bearing tube, which naturally can also be fitted on parts firmly connected with the draw rod or the bearing tube, such as the cover or yoke part.

The cover part or yoke part can be screwed to the end of the bearing tube remote from the cross-piece, and the screw connection can at the same time introduce the initial stress into the buffers, that is the traction force buffer and the thrust force buffer. For the screwing of the cover part or yoke part with the bearing tube, in contrast to the known solution according to Fed. German Publ. Sp. No. 2,732,610, several screws can be inserted in parallel so that the tightening moments necessary for the application of the initial stress can be substantially smaller on the individual screws than in the known solution, which facilitates assembly and dismantlement. There is also the fact that when several screws are fitted these can be secured in a simplified manner, for example by an adhesive, which is in contrast to the known solution according to Fed. German Publ. Sp. No. 2,732,610, in which the merely single nut had to be secured by a cotter passing through the draw rod. In that case the difficulty arose that before the cotter fitting position was reached the nut under some circumstances had to be tightened with a very high tightening moment, which therefore could be applied only with difficulties, namely in the case where the prescribed tightening moment was not yet reached in the previous cotter fitting position (one revolution previously).

In order in the case of rotation of the coupling body about its axis to determine unambiguously where the relative rotation of the parts loaded in the axial direction takes place, it is advisable to make the segment ring fast in the circumferential direction on the draw rod. Then the relative rotation necessarily occurs between the segment ring and the radially outwardly directed flange of the ring of L-cross-section, because the friction of the traction force buffer with the radially outwardly directed flange and also with the shoulder formation prevents a relative movement at these points. The friction in such rotating movement can then be adjusted in a defined manner to the dimension required by safety provisions of the torque necessary for the rotation of the coupling body (for example 100 Nm).

The thrust rod can be guided in the passage of the bearing tube through the intermediary of a sliding sleeve especially of synthetic plastics material, as is known per se from Fed. German Publ. Sp. No. 2,732,610.

The bearing tube can be provided with at least one lubricating nipple in order that the sliding guide between draw rod and passage of the bearing tube can be lubricated and re-lubricated.

The securing of the bearing tube of the cross-piece can be effected by flange attachment, as known from Fed. German Publ. Sp. No. 2,732,610.

BRIEF DESCRIPTION OF THE DRAWINGS

The invention will now be described by way of example with reference to the accompanying drawings wherein:

FIG. 1 shows the mounting of a trailer coupling according to the invention in plan view, partially in section;

FIG. 2 shows a section along the line II—II in FIG. 1; and

FIG. 3 shows a longitudinal section corresponding to the section according to FIG. 1, in enlarged representation.

DESCRIPTION OF THE PREFERRED EMBODIMENT

In FIG. 1 the coupling body is designated by 10. The coupling body 10 comprises a tubular draw rod 12. The draw rod 12 passes through a cross-piece 14 which is fitted in the conventional manner on the towing vehicle. The cross-piece 14 is made with a cross-piece bore 16 of standardised size for the passage of the draw rod 12. The external cross-section of the draw rod 12 at the position of passage through the cross-piece 14 and in the adjoining part A of the length corresponds approximately to the cross-section of the cross-piece bore 16. A bearing tube 18 is flanged by means of a flange 20 visible in FIG. 2 to the cross-piece 14. This bearing tube 18 comprises a passage 22 which accommodates the draw rod 12, through the intermediary of a sliding sleeve 24. In an end section B of the bearing tube 18 a shoulder formation 26 is provided which is formed by a radially outer first shoulder face 26a and a radially inner second shoulder face 26b. Against the first shoulder face 26a there lies an annular traction force buffer 28 which abuts with its other end on a radially outwardly directed flange 30a of a ring 30 of L-cross-section. The axially directed sleeve part 30b lies against the radially inner side of the traction force buffer 28 and its end 30c faces the second shoulder face 26b. The ring 30 of L-cross-section lies with its radially outwardly directed flange 30a against a traction abutment of the draw rod 12 in the form of a segment ring 32. The segment ring 32 consists of at least two 180° segments which again have L-cross-section and are laid with their radially inwardly directed legs 32a into a segment ring reception groove 34 close to the free end of the draw rod 12. The segments of the segment ring 32 are secured against radial movement out of the segment ring reception groove 34 by a segment encircling ring 36. The segment encircling ring 36 is secured in the axial direction by the radially outwardly directed flange 30a of the ring of L-cross-section for the one part and a spring ring 38 for the other part which is sprung into a spring ring reception groove 40 on the outside of the segment ring 32. The segment ring 32 is secured against rotation in relation to the draw rod 12 by notched pins 42 or the like which are each inserted halfway into a half bore on the radially inwardly directed leg 32a of the segment ring 32 and a half bore of the draw rod, this half bore opening into the defining surface close to the end of the segment ring reception groove 34.

The bearing tube 18 is closed off by a cover part 44 which is screwed by securing screws 46 to the bearing tube. In an annular chamber 48 of the cover part 44 there is accommodated an annular thrust force buffer 50 which on the other hand abuts on the end face 52, normal to the axis, of the draw rod 12. Lubricant apertures 55 are provided in the sliding sleeve 24 and can be supplied with oil or grease by a lubricating means (not shown).

The following procedure is adopted for assembly:

The bearing tube 18 with the inserted sliding sleeve 24 is flanged to the cross-piece 14. Thereupon the draw rod 12 is pushed through the cross-piece bore 16 and the passage 22 of the bearing tube 18 until the taper surface 54 of the draw rod 12 comes to abut on the taper surface 56 of the bearing tube 18. Thereupon the ring 30 of L-cross-section and the traction force buffer 28 are brought into the position as shown in FIG. 3. Next the 180° segments of the segment ring 32 are laid into the segment ring reception groove 34 and secured against rotation by the notched pins 42 and against radial displacement by the segment encircling ring 36. The segment encircling ring 36 is secured by insertion of the spring ring 38. Now the cover part 44 with inserted thrust force buffer 50 is placed against the bearing tube 18 and screwed thereto by the screws 46. In this screwing operation the traction force buffer 28 and the thrust force buffer 50 are placed under initial compression, whereby the taper surface 54 departs again from the taper surface 56, but the radially inner shoulder face 26b retains its distance from the end 30c of the sleeve part 30b. Thus assembly is terminated. Thenceforth traction force is transmitted by the draw rod by way of the segment ring 32, the ring 30 of L-cross-section, the traction force buffer 28 and the radially outer shoulder face 26a to the bearing tube 18 and from the bearing tube 18 to the cross-piece 14. If the traction force exceeds a predetermined amount, the traction force buffer 28 is deformed so far that the end 30c of the axially directed sleeve 30b strikes against the radially inner shoulder face 26b. Therefore concerning these surfaces one speaks of traction distance limiting faces. The traction force transmission then takes place partially through the traction force limiting stops.

A thrust force, such as occurs for example when the trailer over-runs towards the braked towing vehicle, is transmitted by the draw rod 12 by way of the thrust force buffer 50 to the cover part 44, from the cover part 44 to the screws 46, from the screws 46 to the bearing tube 18 and from the bearing tube 18 to the cross-piece 14. If the thrust force exceeds a predetermined amount, the taper faces 54 and 56 come to abutment; regarding these taper faces one therefore speaks of thrust distance limiting stops. These thrust distance limiting stops thenceforth take over a part of the thrust force transmission.

I claim:

1. A trailer coupling for a towing vehicle having a coupling body, a draw rod issuing from the coupling body, a cross-piece for attachment to the towing vehicle, a bearing tube secured to the cross-piece and having a passage therein concentric with the bore of the cross-piece, said draw rod passing through a bore in the cross-piece and being guided in said passage, said draw rod being axially supported on the bearing tube against traction force and thrust force transmission, the cross-section of the draw rod occupying substantially the full cross-section of the cross-piece bore, and the bearing tube, commencing on the side of the cross-piece remote from the coupling body, extending exclusively in the direction of the coupling body, wherein the draw rod is supported in both force directions on an end section of the bearing tube remote from the cross-piece.

2. A trailer coupling for a towing vehicle having a coupling body, a draw rod issuing from the coupling body, a cross-piece for attachment to the towing vehicle, a bearing tube secured to the cross-piece and having a passage therein concentric with the bore of the cross-piece, said draw rod passing through a bore in the cross-piece and being guided in said passage, said draw rod being axially supported on the bearing tube against traction force and thrust force transmission, the cross-section of the draw rod occupying substantially the full cross-section of the cross-piece bore, and the bearing tube, commencing on the side of the cross-piece remote from the coupling body, extending exclusively in the direction of the coupling body, wherein the draw rod is supported in the traction direction on a shoulder formation of the bearing tube by a traction abutment on the draw rod side, which can be fitted on the draw rod after the draw rod has been guided through the passage, the draw rod being supported in the thrust direction on a cover part which is fittable on the end of the bearing tube remote from the cross-piece after the fitting of the traction abutment on the draw rod.

3. A coupling according to claims 1 or 2, wherein the mounting of the cross-section of the draw rod in a part of the length of the bearing tube adjoining the cross-piece, possesses a cross-section corresponding to the cross-section of the cross-piece bore.

4. A coupling according to claim 2, wherein an annular traction force buffer is arranged between the abutment on the draw rod side and the shoulder formation.

5. A coupling according to claim 4, wherein traction distance limiting stops are provided between traction abutment on the draw rod side and the shoulder formation.

6. A coupling according to claim 5, wherein the traction force buffer is accommodated axially between a radially outwardly pointing flange, normal to the axis and abutting on the traction abutment, of a ring of L-cross-section and a first radially outer shoulder face of the shoulder formation, and in that the traction distance limiting stops are formed by a second radially inner shoulder face of the shoulder formation and the end directed towards the cross-piece of a sleeve part, directed parallel with the axis and abutting on the traction force buffer on its radially inner side, of the ring of L-shaped cross-section.

7. A coupling according to claim 2, wherein the traction abutment is formed by a segment ring which is accommodated and secured in a segment ring reception groove of the draw rod.

8. A coupling according to claim 7, wherein the segment ring is secured in the radial direction by a segment encircling ring and in that the segment encircling ring is secured on the segment ring in the axial direction by the flange, normal to the axis, of the ring of L-shaped cross-section for the one part and by a radially resilient spring ring for the other part, the latter being sprung into a spring ring reception groove in the external circumferential surface of the segment ring.

9. A coupling according to claim 2, wherein a thrust force buffer is arranged between the end of the draw rod remote from the cross-piece and the cover part.

10. A coupling according to claim 9, wherein thrust distance limiting stops are provided between the draw rod and the bearing tube.

11. A coupling according to claim 2, wherein the cover part is screwed with the end of the bearing tube remote from the cross-piece, possibly with initial stressing of the traction force buffer and/or the thrust force buffer.

12. A coupling according to claim 7, wherein the segment ring is secured against relative rotation on the draw rod.

13. A coupling according to claims 1 or 2, wherein the draw rod is guided in the passage of the bearing tube through the intermediary of a sliding sleeve.

14. A coupling according to claims 1 or 2, wherein the bearing tube comprises at least one lubricant connection for the lubrication of the sliding guide between the draw rod and the passage of the bearing tube.

15. A coupling according to claims 1 or 2, wherein the bearing tube is flanged to the cross-piece.

* * * * *